(12) United States Patent
Wang

(10) Patent No.: US 6,390,446 B1
(45) Date of Patent: May 21, 2002

(54) STRUCTURE FOR PIPE JOINT FILTER

(76) Inventor: Tzy-Jen Wang, No. 29 Tour Luen Lane, Tour Luen Li, Chang Hua Hsien (TW)

( * ) Notice: Subject to any disclaimer, the term of this patent is extended or adjusted under 35 U.S.C. 154(b) by 0 days.

(21) Appl. No.: 09/625,977

(22) Filed: Jul. 26, 2000

(51) Int. Cl.$^7$ .............................................. F16K 51/00
(52) U.S. Cl. ..................... 251/148; 210/429; 210/445; 210/448; 210/450
(58) Field of Search .......................... 251/148; 210/448, 210/445, 450, 429

(56) References Cited

U.S. PATENT DOCUMENTS

| 345,145 A | * | 7/1886 | Jones | 210/448 |
|---|---|---|---|---|
| 1,901,655 A | * | 3/1933 | Keys | 210/448 |
| 2,530,283 A | * | 11/1950 | Brown | 210/448 |
| 2,658,625 A | * | 11/1953 | Rafferty | 210/448 |
| 2,709,566 A | * | 5/1955 | Davis | 251/148 |
| 3,182,952 A | * | 5/1965 | Montesi | 251/148 |
| 3,771,664 A | * | 11/1973 | Schrink et al. | 210/448 |
| 4,023,773 A | * | 5/1977 | Wise | 251/148 |
| 4,442,003 A | * | 4/1984 | Holt | 210/445 |
| 5,360,036 A | * | 11/1994 | Kieper | 251/148 X |
| 5,862,667 A | * | 1/1999 | Prince et al. | 210/448 X |

* cited by examiner

*Primary Examiner*—Henry C. Yuen
*Assistant Examiner*—John Bastianelli
(74) *Attorney, Agent, or Firm*—Troxell Law Office PLLC

(57) ABSTRACT

The invention is an improved structure for a pipe joint filter. The pipe joint equips a water-blocking valve on the top, an extruded joint structure with male screw threads on the lateral side, and a ring pipe at the free end of the pipe joint. A washer is laid between the pipe joint and the ring pipe to prevent water leakage. The ring pipe is comprised of a screw nut on the free end of pipe joint and a tightened pipe interlocked at the inner rim of a screw nut. Furthermore, a convex edge is extended from the top of the tightened pipe. From the inner angle of the convex edge heading inward, there is a stopper edge to exactly compress the ring edge of a filtration net against the stopper edge of a tightened pipe for proper fixture of the pipe joint. Thus, a filtration net can be promptly and easily fixed between a pipe joint and a ring pipe to achieve water filtration effect.

3 Claims, 6 Drawing Sheets

STRUCTURE FOR PIPE JOINT FILTER

BACKGROUND OF THE INVENTION

1) Field of the Invention

The invention, a kind of improved structure for pipe joint filter is to equip a ring pipe joint fitting with a washer at the free end of a pipe joint. The structural characteristics of the invention is that from the inner angle of the convex edge of a tightened pipe on a ring pipe heading inward, there is a stopper edge to exactly compress the ring edge of a filtration net against the stopper edge of a tightened pipe for pipe joint fixture. Thus, a filtration net can be promptly and easily fixed between a pipe joint and a ring pipe to achieve water filtration effect. Thus, the invention provides a kind of improved structure for a pipe joint filter with effects of cost reduction and optimal water leakage protection.

2) Description of the Prior Art

Currently, water pollution becomes very serious, especially for the chemical fluid for industry usage due to a great amount of impurities in water source, of which results accumulation and damage and peeling on the inner surface of a pipe. The major issue in solving water source problem is to avoid water entering a pipe without blocking for the resulting unrecoverable damage. Thus, normally, a filter device is equipped in advance for water filtration.

Please refer FIGS. 1 and 2 for the pipe joint filter of prior product. Pipe joint is mainly in a form of Y tubular joint structure. The straight pipe 51 and inclined pipe 52 are internally connected. Straight pipe 51 equips a stopper panel 511, which furnishes a flow opening 512 to control water flow heading inclined pipe 52. Filtration net 53 is equipped on the inner side of inclined pipe 52 to allow water enter flow opening of the stopper panel. After passing filtration net 53, water enters straight pipe 51 from the intersection joint 521 of the straight pipe and inclined pipe to achieve water filtration effect. However, due to the structural limit for the pipe joint filter, it is not practical in application as expected.

Please refer FIG. 2, a drawing of assembly and disassembly embodiment for prior pipe joint in an open state. Normally, after the use of a common filtration net for certain period of time, screw nut 522 on the inclined pipe joint must be taken off due to the attached impurities on filtration net 53 prior to disassembling filtration net 53. However, due to constant water flow, screw nut 522 can not be directly taken off prior to blocking water. The plumbing subcontractors have to install water blocking devices (all kinds of various valves) beside each pipe joint to shut water source in advance. Because of the structural property that water blocking devices must be installed beside pipe joints, during the production of pipe joints, additional cost is generated and it leads to burden for a plumbing subcontractor.

Based on the above various practical defectives for prior product, the inventor positively researches product improvement with various experiments and revisions and eventually develops the invention, an improved structure of pipe joint filter which can not only get rid of the defectives of prior product but also cab enhance the effect of practical application for the product.

SUMMARY OF THE INVENTION

The main objective of the invention is to provide a kind of improved structure for pipe joint filter. The pipe joint equips a water-blocking valve on the top, an extruded joint structure with male screw threads on the lateral side, and a ring pipe inserted with a washer at the free end of the pipe joint. The ring pipe is comprised of a screw nut on the free end of a pipe joint and a tightened pipe interlocked at the inner rim the screw nut. A convex edge is extended from the top of the tightened pipe. From the inner angle of the convex edge heading inward, there is a stopper edge to exactly compress the ring edge of a filtration net against the stopper edge of the tightened pipe for pipe joint fixture. Thus, a filtration net can be promptly and easily fixed between a pipe joint and a ring pipe to achieve water filtration effect.

The secondary objective of the invention is to provide a kind of low-cost improved structure for a pipe joint filter. By directly equipping a water-blocking valve of a pipe joint on the top and a ring pipe on the lateral side to simultaneously compress ring edge of a filtration net against a tightened pipe of the ring pipe, the effect of water filtration is achieved. During cleaning a filtration net, the water-blocking valve on a pipe joint can be directly controlled to block water source. Thus, after unblocking a water pipe, a filtration net can be conveniently taken off for cleaning without installing various valves around a pipe joint for water blocking. The invention provides a kind of low-cost improved structure for a pipe joint filter.

The additional objective of the invention is to provide a kind of improved structure for a pipe joint filter to avoid water leakage. By locking a pipe joint and a ring pipe and equipping a washer simultaneously between the pipes to tightly assemble the pipe joint and the ring pipe, the effect of optimal water leakage prevention is achieved.

The followings are brief description for optimal embodiments of the invention for committee's better understanding in the structural assembly and operations of the invention.

BRIEF DESCRIPTION OF THE DRAWINGS

FIG. 3A is a perspective view of tightened pipe shown in FIG. 3.

DETAILED DESCRIPTION OF THE PREFERRED EMBODIMENT

Figure 1:
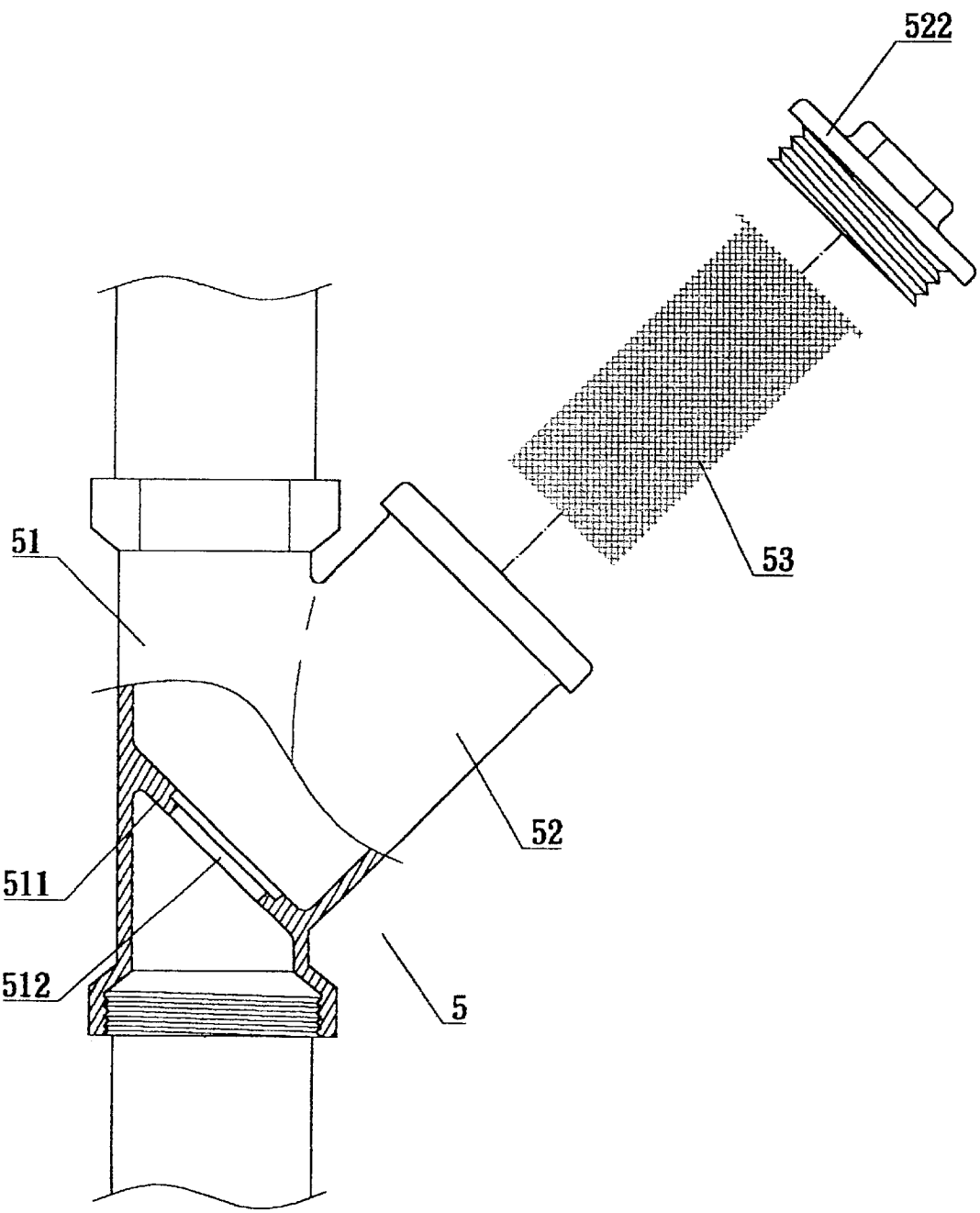
FIG. 1 is a planar drawing of embodiment for prior pipe joint.
Figure 2:
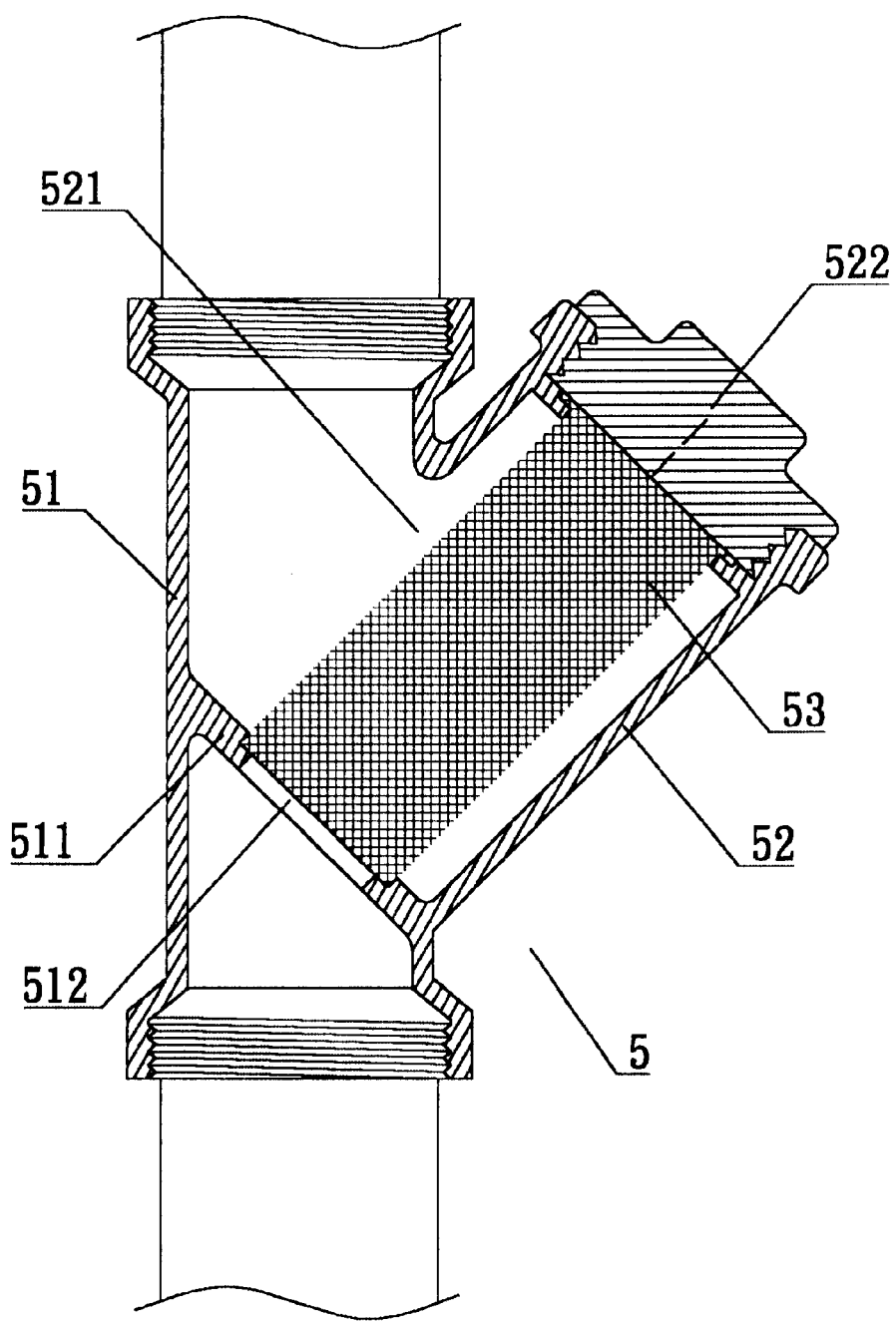
FIG. 2 is a drawing of assembly and disassembly embodiment for prior pipe joint in an open state.
Figure 3:
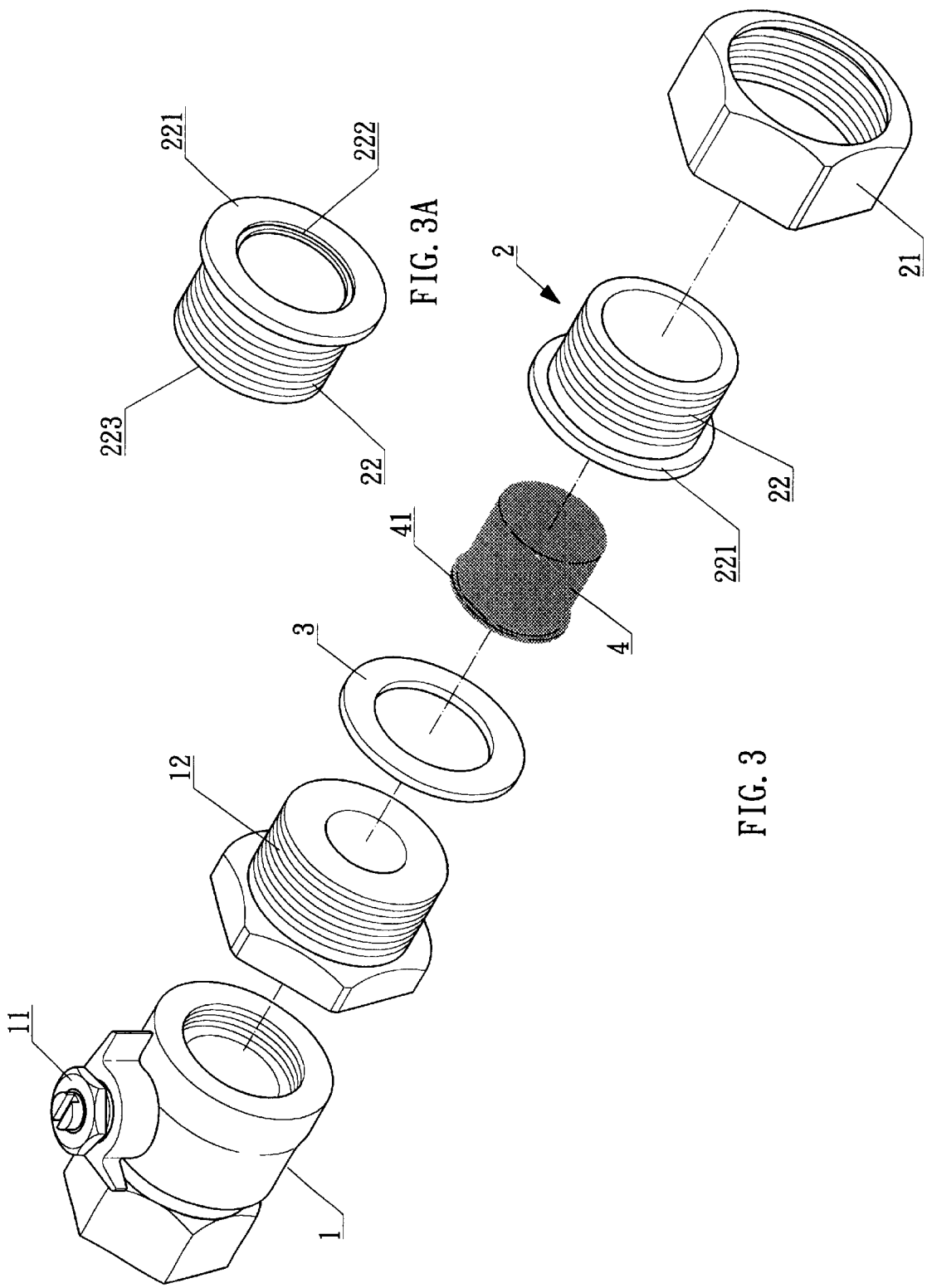
FIG. 3 is an exploded drawing of an embodiment of the invention, a pipe joint.
Figure 4:
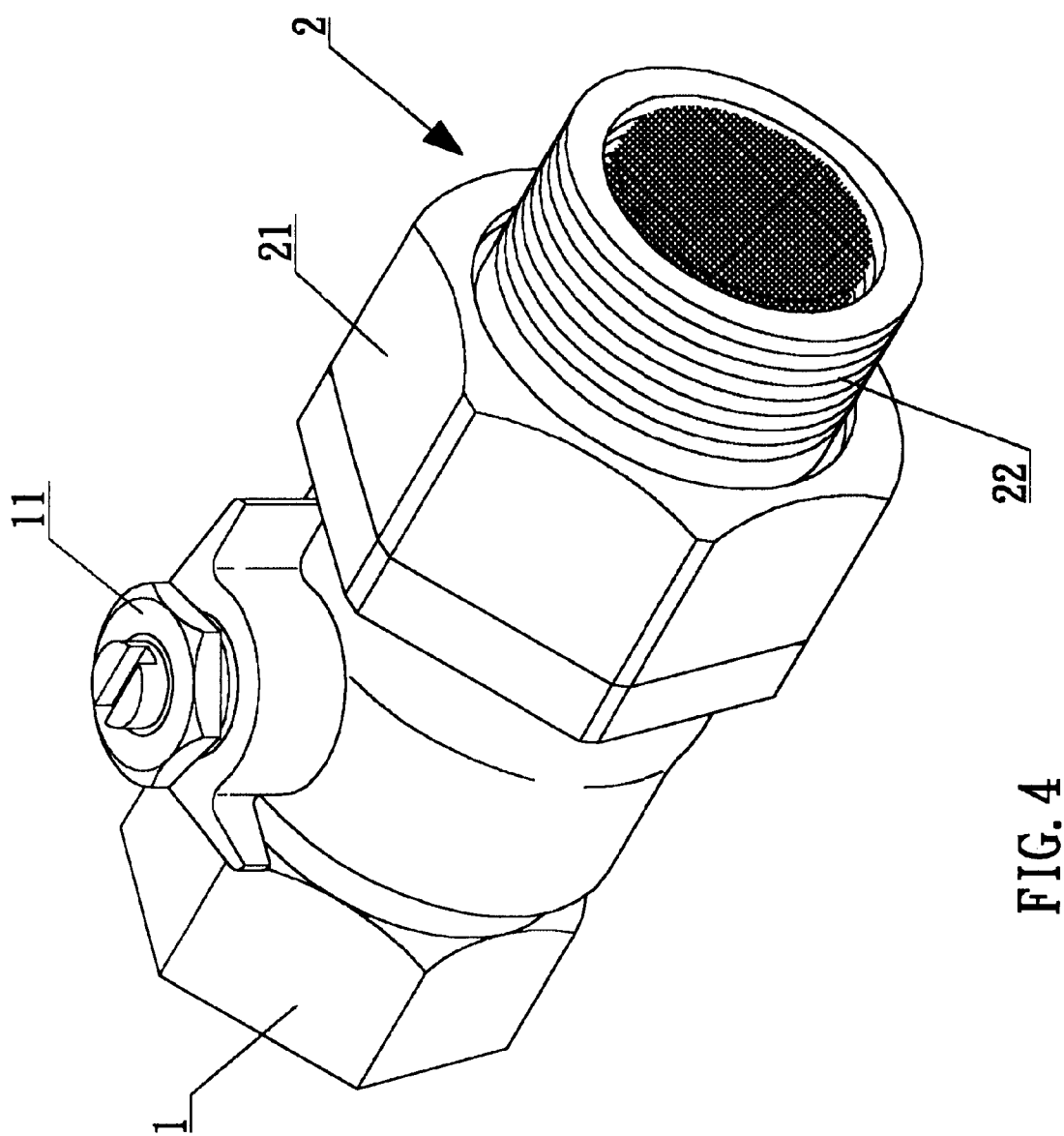
FIG. 4 is an isometric drawing of an embodiment of the invention, a pipe joint.

Please refer FIGS. 3 and 4, to clearly identify the structure embodiments of the invention. Pipe joint 1 of the invention is to equip water-blocking valve 11 on the top and extruded joint structure with male screw thread 12 on the lateral side. By locking ring pipe 2 at the male screw thread 12 end of the pipe joint, and equipping washer 3 simultaneously between pipe joint 1 and ring pipe 2 for tightly assembly, the effect of optimal water leakage prevention is achieved.

Ring pipe 2 is comprised of screw nut 21 of male screw thread 12 end of a pipe joint and tightened pipe 22 interlocked at the inner rim of screw nut 21. There is edge 221 extended from the top of tightened pipe 22. Inwardly, there is a stopper edge 222 to exactly compress the ring edge 41 of filtration net 4 against stopper edge 222 of he tightened pipe for proper fixture.

Filtration net 4 is a fine stainless steel net in cup shape. The diameter of filtration net 4 can be changed according to that of tightened pipe 22. The net size of filtration net 4 can also be changed on the basis of the needs.

Figure 5:
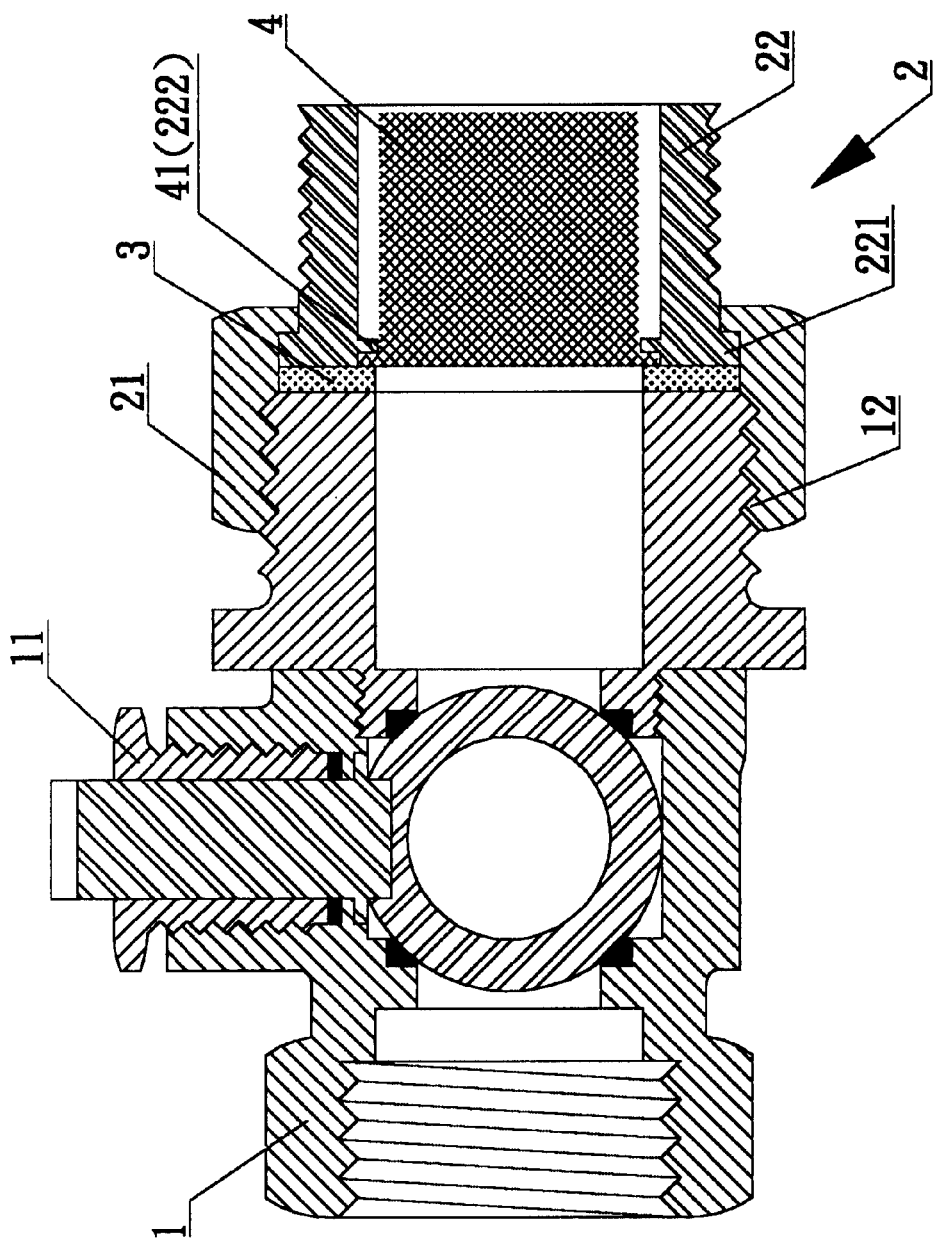
FIG. 5 is a planar structure drawing of an embodiment of the invention.

Please refer FIG. 5, a planar structure drawing of an embodiment of the invention. By directly equipping water-blocking switch 11 of pipe joint 1 on the top and ring pipe 2 on the lateral side to simultaneously compress ring edge 41 of filtration net against tightened pipe 22 of the ring pipe, the effect of water filtration is achieved. During cleaning filtration net 4, water-blocking valve 11 on a pipe joint can be directly controlled to block water source. Thus, after unblocking a water pipe, filtration net 4 can be conveniently taken off for cleaning without installing various valves around a pipe joint for water blocking. The invention provides a kind of low-cost improved structure for a pipe joint filter.

When ring pipe 2 is firmly locked with pipe joint 1, filtration net 4 is exactly compressed against tightened pipe 22. Thus, a filtration net can be promptly and easily fixed between pipe joint 1 and ring pipe 2 to achieve water filtration effect.

Moreover, by locking pipe joint 1 and ring pipe 2 and equipping washer 3 simultaneously between the pipes to tightly assemble the pipe joint and the ring pipe, the effect of optimal water leakage prevention is achieved.

Figure 6:
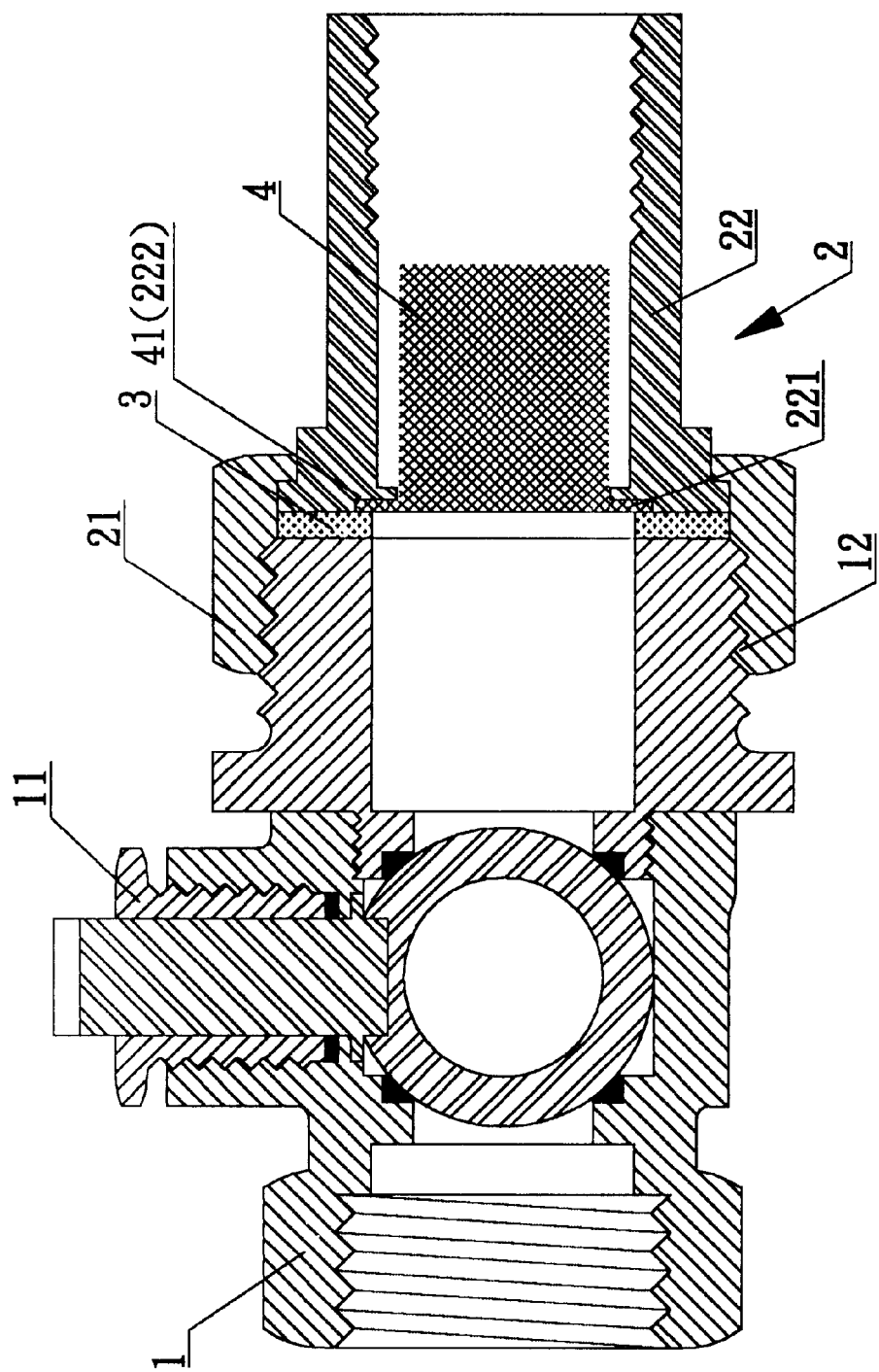
FIG. 6 is a drawing of additional embodiment of the invention.

As shown in FIG. 6, the diameter of tightened pipe 22 can be changed according to water flow volume. Also, the flow length can be adjusted on the basis of internal connection or external connection (The length for external connection is longer than that of internal connection.). The free end of tightened pipe 22 can be in a state of straight pipe with female screw threads, male screw threads, or without screw threads on the basis of the needs.

In summary, the invention, improved structure for a pipe joint filter, is characterized as achieving various requirements for the invention. The above explanation is a substantial embodiment of the invention, which provides greater practical performance than products of prior art. Furthermore, the present invention meets all new patent application requirements and is lawfully submitted for review and the granting of the commensurate patent rights to thereby encourage the spirit of invention and its rightful protection under the patent law.

What is claimed is:

1. A pipe joint filter assembly comprising:
   a) a water blocking valve structure;
   b) a joint structure extending from the water blocking valve structure, the joint structure including a male threaded portion with an end;
   c) a sealing washer in contact with the end;
   d) a tightened pipe having a hollow interior, a first end in contact with the sealing washer, and including an outward extending edge at the first end and an inward stopper edge spaced from and adjacent to the first end, the inward stopper edge extending into the hollow interior;
   e) a filtration net located in the hollow interior of the tightened pipe and including a cup-shaped filter with an outer ring edge, the outer ring edge engaging the sealing washer and the inward stopper edge; and,
   f) a screw nut engaging the outward extending edge and threaded onto the threaded portion of the joint structure to clamp the outer ring edge between the sealing washer and the inward stopper edge of the tightened pipe.

2. The pipe joint filter assembly of claim 1 wherein the tightened pipe further comprises a second end portion having external threads thereon.

3. The pipe joint filter assembly of claim 1 wherein the tightened pipe further comprises a second end portion having internal threads thereon.

* * * * *